United States Patent [19]
Saver

[11] 3,890,931
[45] June 24, 1975

[54] SANITARY PET BOX

[76] Inventor: Helene Saver, 155 E. 49th St., New York, N.Y. 10017

[22] Filed: June 17, 1974

[21] Appl. No.: 480,046

[52] U.S. Cl. ............................................... 119/1
[51] Int. Cl. ............................................ A01k 29/00
[58] Field of Search ...................................... 119/1

[56] References Cited
UNITED STATES PATENTS
| | | | |
|---|---|---|---|
| 1,773,141 | 8/1930 | Hodgson | 119/1 UX |
| 2,144,329 | 1/1939 | Conlon et al. | 119/1 |
| 2,390,854 | 12/1945 | Thompson | 119/1 |

Primary Examiner—Hugh R. Chamblee
Attorney, Agent, or Firm—Heilman, Heilman and Casella

[57] ABSTRACT

A sanitary disposal box for pets such as dogs or cats and including a base with sloping surfaces toward a central hole where refuse is removed to be deposited in a movable pan underneath the base. Walls enclose the base except for an entrance gate where the pet can move in and out of the box. The base is mounted on two angle irons which maintain the base about four inches above a supporting floor, and the pan is positioned between the angle irons for easy removal.

1 Claim, 5 Drawing Figures

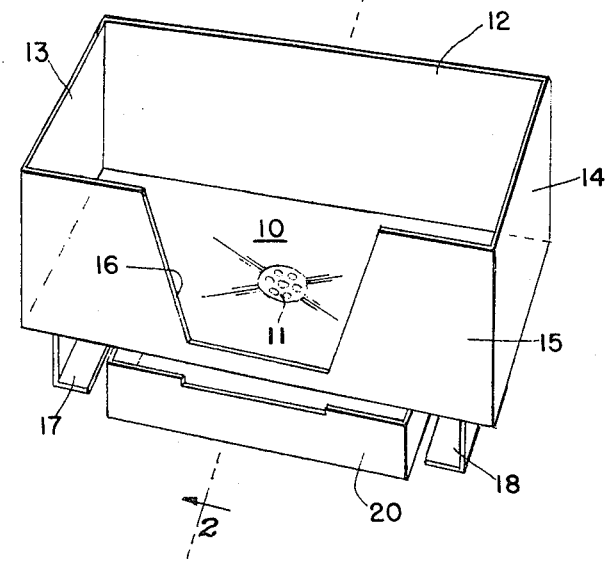
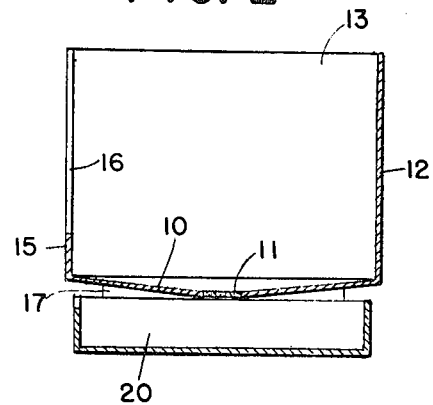
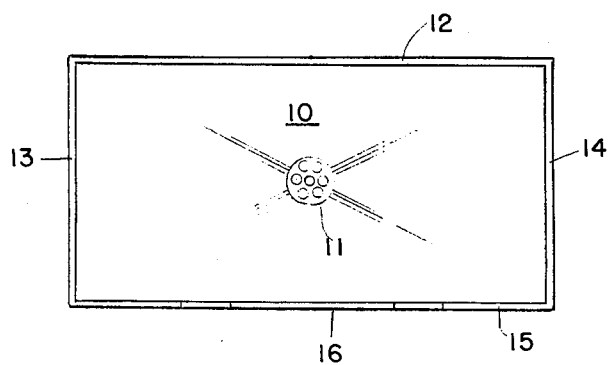
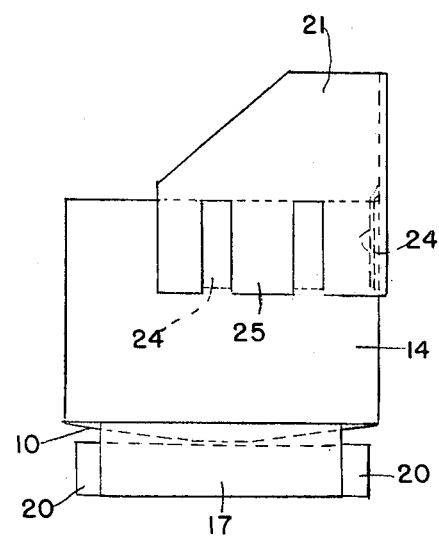
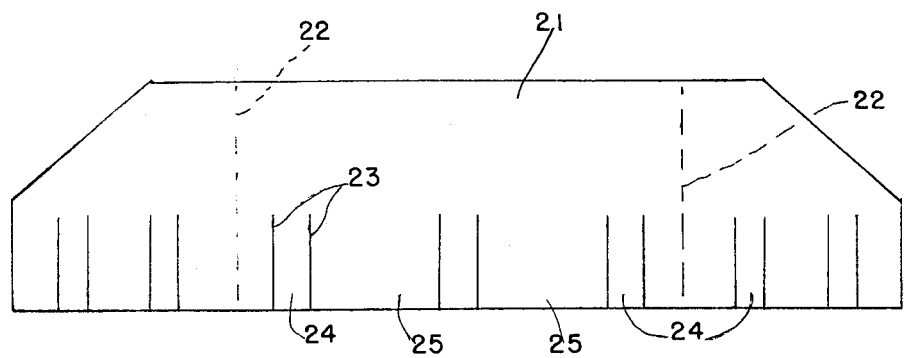

SANITARY PET BOX

BACKGROUND OF THE INVENTION

Many types of pet boxes have been proposed for transporting small dogs and cats and for providing sanitary facilities for them within a home. The disposal box described herein combines many facilities not found in prior art arrangements. After using, the box can be cleaned by rinsing with water from a faucet or hose. The refuse is collected through a hole in the base and stored in a pan which slides from the base when it is to be cleaned. The present invention supplies a compact box plus a sliding pan to take care of all of a pet's sanitary requirements.

One of the features of the invention is a base with sloping surfaces toward a central hole and a removable storage box below the base where disposable material may be kept.

Another feature of the invention is a removable metallic shield which is placed on the back of the box for use with male pets.

Another feature of the invention is the ease with which the box and storage tray can be cleaned and maintained in a sanitary condition.

Additional details of the invention will be disclosed in the following description, taken in connection with the accompanying drawings.

BRIEF DESCRIPTION OF THE DRAWINGS

FIG. 1 is a perspective view of the sanitary pet box including the removable storage pan.

FIG. 2 is a cross-sectional view of the box shown in FIG. 1 and is taken along line 2—2 of that figure.

FIG. 3 is a top view of the box.

FIG. 4 is a side view of the box showing the additional disposable shield added to the rear wall.

FIG. 5 is a development of the shield before it is folded and prior to attachment to the box.

DESCRIPTION OF THE PREFERRED EMBODIMENT

Referring now to the figures, the pet box comprises a base 10, made of metal, and formed with sloping surfaces which terminate in a central drainage plate 11, formed with a plurality of holes. The box includes a rear wall 12, side walls 13 and 14 and a front wall 15 formed with a gate or opening 16 where the pet enters or leaves the box. Two angle irons 17 and 18 are attached to the base 10 and support the box, maintaining the base 10 about 3½ inches above the floor. A removable pan 20 is positioned in the space between the floor and the base 10 and is removable by sliding toward the front of the box. The pan 20 collects fluid wastes which have passed through the holes in drainage plate 11.

An auxiliary shield 21 can be added to the back and side walls of the box for use with a male pet, such as a dog to prevent splashing over the side walls. The shield 21 is preferably made of the same material as the box, i.e., metal. The shields 21 are formed with fold lines 22 (FIG. 5) and a plurality of cuts which form narrow strips 24 which can be bent to lie on the outside surfaces of the box while the intermediate strips 25 lie on the inside surfaces.

The combination of the box with sloping base 10, the storage pan 20, and the shield 21 form a useful sanitary facility for any small pet and operates to increase the usefulness and cleanliness of pet association.

The embodiments of the invention in which an exclusive property or priviledge is claimed are defined as follows:

1. A sanitary disposal device for pets comprising:
  a. a metal box having a base member divided into four sections, each with sloping surfaces leading to a central drainage plate formed with a series of holes; said box also including a back wall, two side walls, and a front wall formed with a gate for each access by a pet;
  b. two angle irons positioned under the base of said box for supporting it above a floor and thereby defining a space under the box;
  c. a storage pan removably positioned in the space under the box for collecting liquid refuse from the box which passes through the holes in the drainage plate in the base; and
  d. a metal folding shield removably attached to the back and side walls of the box; said shield formed with strips which are placed outside the box and formed with sloping corners at the end portions.

* * * * *